United States Patent
Jung et al.

(10) Patent No.: US 11,868,560 B2
(45) Date of Patent: Jan. 9, 2024

(54) SENSOR DEVICE AND DRIVING METHOD THEREOF USING MULTI-FREQUENCY TRANSMISSION

(71) Applicant: SAMSUNG DISPLAY CO., LTD., Yongin-si (KR)

(72) Inventors: Keum Dong Jung, Yongin-si (KR); Ji Woong Kim, Yongin-si (KR); Hyung Gun Ma, Yongin-si (KR); Kyung Tea Park, Yongin-si (KR); Moon Jae Jeong, Yongin-si (KR); Sang Hyun Heo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 31 days.

(21) Appl. No.: 17/809,091

(22) Filed: Jun. 27, 2022

(65) Prior Publication Data
US 2023/0152922 A1 May 18, 2023

(30) Foreign Application Priority Data
Nov. 16, 2021 (KR) .......................... 10-2021-0157981

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05); *G06F 3/0412* (2013.01); *G06F 3/0448* (2019.05); *G06F 2203/04112* (2013.01)

(58) Field of Classification Search
CPC .. G06F 3/04166; G06F 3/0446; G06F 3/0412; G06F 3/0448; G06F 17/145; G06F 17/146; G06F 17/16; G06F 2203/04112
See application file for complete search history.

(56) References Cited

U.S. PATENT DOCUMENTS

| | | | |
|---|---|---|---|
| 7,876,311 B2 | 1/2011 | Krah et al. | |
| 8,810,537 B2 | 8/2014 | Yousefpor et al. | |
| 9,740,356 B1 | 8/2017 | Chen et al. | |
| 10,310,670 B2 * | 6/2019 | Cheng | G06F 3/04166 |
| 10,353,518 B2 | 7/2019 | Petrovic et al. | |
| 11,531,439 B1 * | 12/2022 | Shen | H03M 1/12 |
| 2018/0253183 A1 * | 9/2018 | Imanilov | H04L 5/0021 |
| 2018/0253185 A1 * | 9/2018 | Imanilov | H04L 5/0021 |
| 2020/0393929 A1 * | 12/2020 | Kim | G06F 3/04166 |

(Continued)

FOREIGN PATENT DOCUMENTS

KR 10-2021-0017598 2/2021

*Primary Examiner* — Darlene M Ritchie
(74) *Attorney, Agent, or Firm* — F. CHAU & ASSOCIATES, LLC

(57) ABSTRACT

A sensor device of the present invention includes first sensors; second sensors forming capacitance with the first sensors; a multi-frequency generator generating a first frequency signal and a second frequency signal having different frequencies; a sensor transmitter supplying first driving signals based on the first frequency signal to first sensors of a first group among the first sensors, supplying second driving signals based on the second frequency signal to first sensors of a second group among the first sensors, and simultaneously supplying the first driving signals and the second driving signals; and a sensor receiver simultaneously receiving sensing signals from the second sensors.

20 Claims, 9 Drawing Sheets

(56) References Cited

U.S. PATENT DOCUMENTS

| | | |
|---|---|---|
| 2021/0184688 A1 | 6/2021 | McGibney et al. |
| 2021/0200349 A1* | 7/2021 | Mohamed ............. G06F 3/0446 |
| 2021/0278949 A1* | 9/2021 | Moseley ............... G06F 3/0416 |
| 2021/0294462 A1* | 9/2021 | Fotopoulos ........ G06F 3/041662 |
| 2022/0147177 A1* | 5/2022 | Kim .................... G06F 3/04166 |
| 2022/0187946 A1* | 6/2022 | Miyamoto ................ G06F 3/03 |

* cited by examiner

SENSOR DEVICE AND DRIVING METHOD THEREOF USING MULTI-FREQUENCY TRANSMISSION

CROSS-REFERENCE TO RELATED APPLICATION

The application claims priority to and the benefit of Korean Patent Application No. 10-2021-0157981, filed Nov. 16, 2021, which is hereby incorporated by reference for all purposes as if fully set forth herein.

FIELD

This disclosure relates generally to a sensor device for sensing user input on a touch panel or touchscreen, and a driving method thereof.

DISCUSSION OF RELATED ART

With the development of information technology, the importance of display devices, which are a connection medium between users and information, has been emphasized. In response to this, the use of display devices such as a liquid crystal display device, an organic light emitting display device, and the like has been increasing.

A display device may include a display unit for displaying an image and a sensor unit for sensing a user's input. As the area of the display unit increases, the number of sensing electrodes (that is, sensors) increases, and the sensing time that can be allocated to sensing channels decreases. Accordingly, there is a need for a sensor unit having a high sensing frequency, that is, a touch report rate.

In addition, as a display frequency of the display unit increases in order to display a smooth image, a sensor unit having a high touch report rate is preferred.

SUMMARY

Embodiments disclosed herein relate to a touch sensor device and driving method thereof capable of achieving a high touch report rate by simultaneously supplying driving signals to an entire set of first sensors, e.g., all row electrodes or all column electrodes of intersecting electrodes of the touch sensor device.

A sensor device according to an embodiment of the inventive concept may include first sensors; second sensors forming capacitance with the first sensors; a multi-frequency generator generating a first frequency signal and a second frequency signal having different frequencies; a sensor transmitter supplying first driving signals based on the first frequency signal to first sensors of a first group among the first sensors and simultaneously supplying second driving signals based on the second frequency signal to first sensors of a second group among the first sensors; and a sensor receiver simultaneously receiving sensing signals from the second sensors.

At least two of the first driving signals may have inverted waveforms from each other, and at least two of the second drive signals may have inverted waveforms from each other.

A sum of amplitudes of the first driving signals may be 0, and a sum of amplitudes of the second driving signals may be 0.

A first sensor of another group may not be located between the first sensors of the first group, and a first sensor of another group may not be located between the first sensors of the second group.

Each two or more first sensors of the first group may form each of first sub-groups, a first sensor of another group may not be located within the first sub-groups, and a first sensor of another group may be located between the first sub-groups.

Each two or more first sensors of the second group may form each of second sub-groups, a first sensor of another group may not be located within the second sub-groups, and a first sensor of another group may be located between the second sub-groups.

The first sub-groups and the second sub-groups may be alternately arranged.

The sensor transmitter may include a modulator generating the first driving signals to have a first phase or a second phase based on the first frequency signal and generating the second driving signals to have the first phase or the second phase based on the second frequency signal.

A ratio in which the first driving signals have the first phase or the second phase may be the same as a ratio in which the second driving signals have the first phase or the second phase.

The sensor receiver may include a charge amplifier having an input terminal coupled to at least one of the second sensors; and a first band pass filter receiving an output signal of the charge amplifier and receiving at least one frequency signal from the multi-frequency generator.

The first band pass filter may receive a center frequency signal of the first frequency signal and the second frequency signal.

The first band pass filter may receive the first frequency signal and the second frequency signal.

The sensor receiver may further include an analog-to-digital converter converting an output signal of the first band pass filter into a digital signal; a demodulator demodulating an output signal of the analog-to-digital converter; and a plurality of second band pass filters receiving an output signal of the demodulator.

Pass bands of the second band pass filters may be different from each other.

A pass band of one of the second band pass filters may have a frequency of the first frequency signal as a center frequency, and a pass band of another one of the second band pass filters may have a frequency of the second frequency signal as a center frequency.

According to an embodiment of the inventive concept, a driving method of a sensor device including first sensors and second sensors forming capacitance with the first sensors may include generating a first frequency signal and a second frequency signal having different frequencies; supplying first driving signals based on the first frequency signal to first sensors of a first group among the first sensors and simultaneously supplying second driving signals based on the second frequency signal to first sensors of a second group among the first sensors; and simultaneously receiving sensing signals from the second sensors.

At least two of the first driving signals may have inverted waveforms from each other, and at least two of the second driving signals may have inverted waveforms from each other.

A sum of amplitudes of the first driving signals may be 0, and a sum of amplitudes of the second driving signals may be 0.

A first sensor of another group may not be located between the first sensors of the first group, and a first sensor of another group may not be located between the first sensors of the second group.

Each two or more first sensors of the first group may form each of first sub-groups, and a first sensor of another group may not be located within the first sub-groups. Each two or more first sensors of the second group may form each of second sub-groups, and a first sensor of another group may not be located within the second sub-groups. The first sub-groups and the second sub-groups may be alternately arranged.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF EMBODIMENTS

Figure 1:
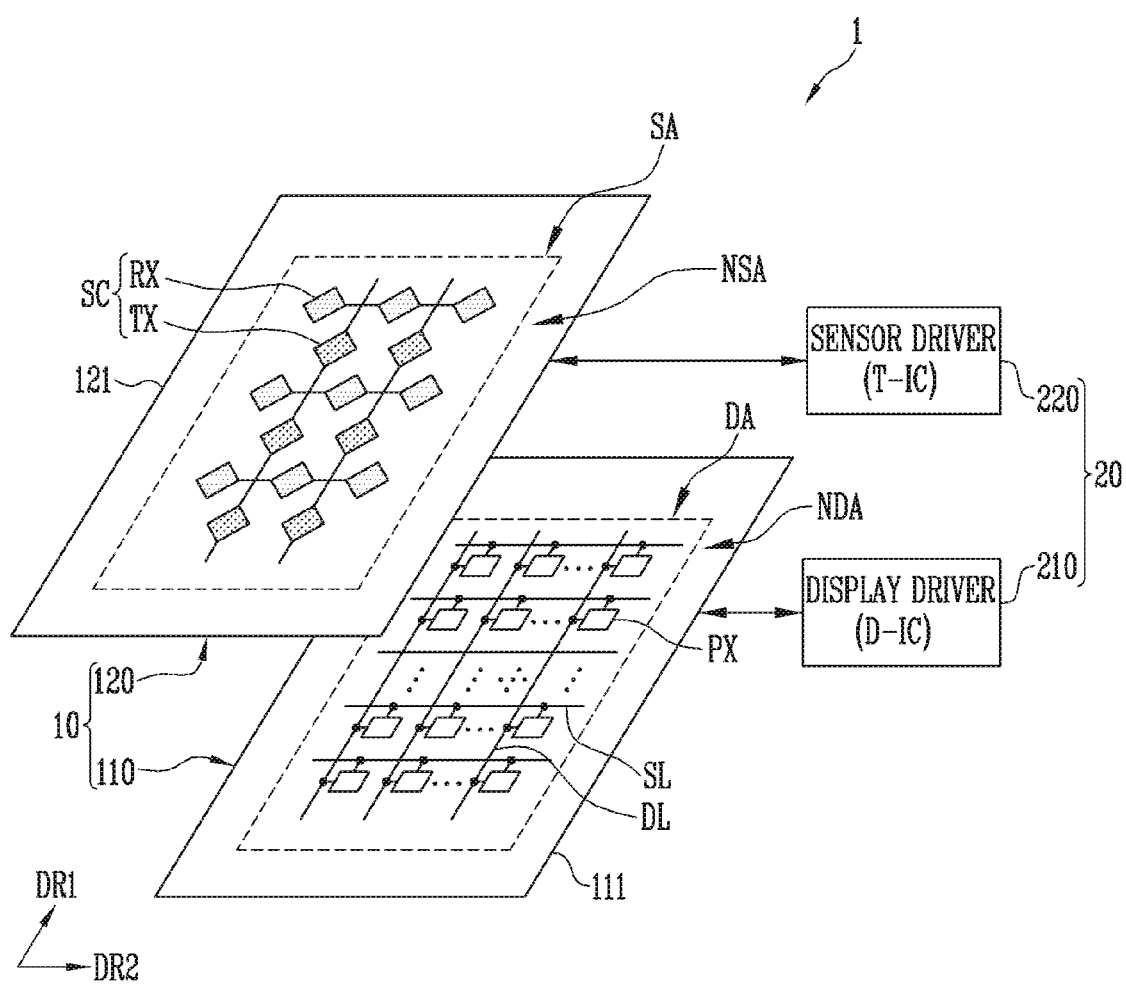
FIG. 1 is a diagram for explaining a display device according to an embodiment of the present inventive concept.

Hereinafter, various embodiments of the inventive concept will be described in detail with reference to the accompanying drawings so that those of ordinary skill in the art may readily implement the inventive concept. The inventive concept may be embodied in various different forms and is not limited to the embodiments described herein.

To clearly describe the embodiments of the inventive concept, parts unrelated to the description are omitted, and the same or similar components are denoted by the same or similar reference characters throughout the specification. In addition, the size and thickness of each component shown in the drawings may be arbitrarily shown for convenience of description.

Herein, the expression "is the same" may mean identical or "substantially the same". Herein, two subjects that are said to be "substantially the same" are sufficiently the same for those of ordinary skill in the art to consider them as the same.

Herein, when a signal is said to "have a frequency $f_X$" or like forms (where $f_X$ is an arbitrary label), the frequency $f_X$ is the dominant frequency component of the signal. In other words, the frequency $f_X$ is the frequency component of the signal having the highest energy among any other frequency components of the signal. A signal "having a frequency" may be referred to interchangeably herein as a "frequency signal".

FIG. 1 is a diagram for explaining a display device according to an embodiment of the inventive concept.

Referring to FIG. 1, a display device 1 according to an embodiment of the inventive concept may include a panel 10 and a driving circuit unit 20 for driving the panel 10.

For example, the panel 10 may include a display unit 110 for displaying an image and a sensor unit 120 for sensing touch, pressure, fingerprint, hovering, or the like. For example, the panel 10 may include pixels PX and sensors SC positioned to overlap at least some of the pixels PX. In an embodiment, the sensors SC may include first sensors TX and second sensors RX. In another embodiment (for example, self-capacitance type), the sensors SC are not divided into a first sensor and a second sensor, but may be configured as one type of sensors. The driving circuit unit 20 may include a display driver 210 for driving the display unit 110 and a sensor driver 220 for driving the sensor unit 120. For example, the pixels PX may display an image in units of display frame periods. For example, the sensors SC may sense a user's input in units of sensing frame periods. A sensing frame period and a display frame period may be independent of each other and may differ from one another. The sensing frame period and the display frame period may be synchronized with each other or may be asynchronous.

According to an embodiment, the display unit 110 and the sensor unit 120 may be manufactured independently of each other, and may be arranged and/or combined such that at least one region overlaps each other. Alternatively, in another embodiment, the display unit 110 and the sensor unit 120 may be integrally manufactured. For example, the sensor unit 120 may be directly formed on at least one substrate constituting the display unit 110 (for example, upper and/or lower substrates of the display panel, or a thin film encapsulation layer) or on other insulating layers or various functional films (for example, an optical layer or a protective layer).

Meanwhile, although FIG. 1 shows an embodiment in which the sensor unit 120 is disposed on a front side (for example, an upper surface on which an image is displayed) of the display unit 110, the position of the sensor unit 120 is not limited thereto. For example, in another embodiment, the sensor unit 120 may be disposed on the back or both surfaces of the display unit 110. In another embodiment, the sensor unit 120 may be disposed on at least one edge region of the display unit 110.

The display unit 110 may include a display substrate 111 and a plurality of pixels PX formed on the display substrate 111. The pixels PX may be disposed in a display area DA of the display substrate 111.

The display substrate 111 may include the display area DA in which an image is displayed and a non-display area NDA outside the display area DA. According to an embodiment, the display area DA may be disposed in a central area of the display unit 110, and the non-display area NDA may be disposed in an edge area of the display unit 110 to surround the display area DA.

The display substrate 111 may be a rigid substrate or a flexible substrate, and the material or physical properties thereof are not particularly limited. For example, the display substrate 111 may be a rigid substrate made of glass or tempered glass, or a flexible substrate made of a thin film made of plastic or metal.

In the display area DA, scan lines SL, data lines DL, and the pixels PX connected to the scan lines SL and the data lines DL may be disposed. The pixels PX may be selected by a scan signal of a turn-on level supplied from the scan lines SL to receive a data signal from the data lines DL, and may emit light having a luminance corresponding to the data signal. Accordingly, an image corresponding to the data signal may be displayed in the display area DA. In the inventive concept, the structure and driving method of the pixels PX are not particularly limited. For example, each of the pixels PX may be implemented as a pixel employing various currently known structures and driving methods.

In the non-display area NDA, various wirings and/or built-in circuits connected to the pixels PX of the display area DA may be disposed. For example, in the non-display area NDA, a plurality of wirings for supplying various power sources and control signals to the display area DA may be disposed. In addition, a scan driver and the like may be further disposed in the non-display area NDA.

In the inventive concept, the type of the display unit 110 is not particularly limited. For example, the display unit 110 may be implemented as a self-emission type display panel such as an organic light emitting display panel. However, when the display unit 110 is implemented as a self-emission type, each pixel is not necessarily limited to a case where only an organic light emitting element is included. For example, a light emitting element of each pixel may be composed of an organic light emitting diode, an inorganic light emitting diode, a quantum dot/well light emitting diode, or the like. A plurality of light emitting elements may be provided in each pixel. In this case, the plurality of light emitting elements may be connected in series, in parallel, or in series and parallel. Alternatively, the display unit 110 may be implemented as a non-emission type display panel such as a liquid crystal display panel. When the display unit 110 is implemented as a non-emission type, the display device 1 may further include a light source such as a backlight unit.

The sensor unit 120 may include a sensor substrate 121 and a plurality of sensors SC formed on the sensor substrate 121. The sensors SC may be disposed in a sensing area SA of the sensor substrate 121.

The sensor substrate 121 may include the sensing area SA capable of sensing a touch input or the like, and a peripheral area NSA outside the sensing area SA. In an embodiment, the sensing area SA may be disposed to overlap at least one area of the display area DA. For example, the sensing area SA may be set as an area corresponding to the display area DA (for example, an area overlapping the display area DA), and the peripheral area NSA may be set as an area corresponding to the non-display area NDA (for example, an area overlapping the non-display area NDA). In this case, when a touch input is provided on the display area DA, the touch input may be detected through the sensor unit 120.

The sensor substrate 121 may be a rigid or flexible substrate, and may be composed of at least one insulating layer. In addition, the sensor substrate 121 may be a transparent or translucent substrate that transmits light, but is not limited thereto. That is, in the inventive concept, the material and physical properties of the sensor substrate 121 are not particularly limited. For example, the sensor substrate 121 may be a rigid substrate made of glass or tempered glass, or a flexible substrate made of a thin film made of plastic or metal. In addition, according to some embodiments, at least one substrate constituting the display unit 110 (for example, the display substrate 111, an encapsulation substrate, and/or the thin film encapsulation layer), or at least one insulating film or a functional film disposed on the inner and/or outer surface of the display unit 110 may be used as the sensor substrate 121.

The sensing area SA may be set as an area capable of responding to the touch input (that is, an active area of a sensor). To this end, the sensors SC for sensing the touch input or the like may be disposed in the sensing area SA.

According to an embodiment, the sensors SC may include the first sensors TX and the second sensors RX.

For example, each of the first sensors TX may extend in a first direction DR1. The first sensors TX may be arranged in a second direction DR2. The second direction DR2 may be different from the first direction DR1. For example, the second direction DR2 may be a direction orthogonal to the first direction DR1. In another embodiment, a direction in which the first sensors TX extend and a direction in which the first sensors TX are arranged may follow other conventional configurations. Each of the first sensors TX may have a form in which first cells having a relatively large area and first bridges having a relatively narrow area are connected. Although FIG. 1 shows the first cells having a diamond shape, the first cells may have various conventional shapes such as a circular shape, a square shape, a triangle shape, a mesh shape, and the like. For example, the first bridges may be integrally formed on the same layer as the first cells. In another embodiment, the first bridges may be formed in a different layer from the first cells, and may electrically connect adjacent first cells to each other.

For example, each of the second sensors RX may extend in the second direction DR2. The second sensors RX may be arranged in the first direction DR1. In another embodiment, a direction in which the second sensors RX extend and a direction in which the second sensors RX are arranged may follow other conventional configurations. Each of the second sensors RX may have a form in which second cells having a relatively large area and second bridges having a relatively small area are connected. Although FIG. 1 shows the second cells having a diamond shape, the second cells may have various conventional shapes such as a circular shape, a square shape, a triangle shape, a mesh shape, and the like. For example, the second bridges may be integrally formed on the same layer as the second cells. In another embodiment, the second bridges may be formed in a different layer from the second cells, and electrically connect adjacent second cells to each other.

According to an embodiment, each of the first sensors TX and the second sensors RX may have conductivity by including at least one of a metal material, a transparent conductive material, and various other conductive materials. For example, the first sensors TX and the second sensors RX may include at least one of various metal materials including gold (Au), silver (Ag), aluminum (Al), molybdenum (Mo), chromium (Cr), titanium (Ti), nickel (Ni), neodymium (Nd), copper (Cu), platinum (Pt), and alloys thereof. In this case, the first sensors TX and the second sensors RX may be configured in a mesh shape. In addition, the first sensors TX and the second sensors RX may include at least one of various transparent conductive materials, such as silver nanowires (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nanotube, and graphene. In addition, the first sensors TX and the second sensors RX may have conductivity by including at least one of various conductive materials. In addition, each of the first sensors TX and the second sensors RX may be formed of a single layer or a multilayer, and cross-sectional structures thereof are not particularly limited.

Meanwhile, in the peripheral area NSA of the sensor unit 120, sensor lines for electrically connecting the sensors TX and RX to the sensor driver 220 or the like may be intensively disposed.

The driving circuit unit 20 may include the display driver 210 for driving the display unit 110 and the sensor driver 220 for driving the sensor unit 120. In an embodiment, the display driver 210 and the sensor driver 220 may be composed of integrated circuit (IC) chips independent of each other. In another embodiment, at least a portion of the display driver 210 and the sensor driver 220 may be integrated together in one IC.

The display driver 210 may be electrically connected to the display unit 110 to drive the pixels PX. For example, the display driver 210 may include a data driver and a timing controller, and the scan driver may be separately mounted in the non-display area NDA of the display unit 110. In another embodiment, the display driver 210 may include all or at least a part of the data driver, the timing controller, and the scan driver.

The sensor driver 220 may be electrically connected to the sensor unit 120 to drive the sensor unit 120. The sensor driver 220 may include a sensor transmitter and a sensor receiver. According to an embodiment, the sensor transmitter and the sensor receiver may be integrated in one IC, but the inventive concept is not limited thereto.

Figure 2:
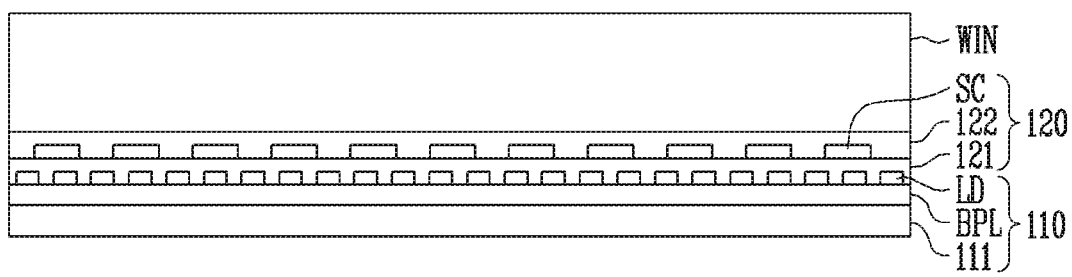
FIG. 2 is a diagram for explaining an example of a stacked structure of the display device of FIG. 1.

FIG. 2 is a diagram for explaining an example of a stacked structure of the display device of FIG. 1.

Referring to FIG. 2, for example, the sensor unit 120 may be stacked on the display unit 110, and a window WIN may be stacked on the sensor unit 120.

The display unit 110 may include the display substrate 111, a circuit element layer BPL formed on the display substrate 111, and light emitting elements LD formed on the circuit element layer BPL. The circuit element layer BPL may include pixel circuits for driving the light emitting elements LD of the pixels PXL, the scan lines SL, the data lines DL, and the like.

The sensor unit 120 may include the sensor substrate 121, the sensors SC formed on the sensor substrate 121, and a protective layer 122 covering the sensors SC. In the embodiment of FIG. 2, the sensor substrate 121 is shown in the form of an encapsulation film covering the pixels PXL. In another embodiment, the sensor substrate 121 may exist separately from the encapsulation film covering the pixels PXL.

The window WIN may be a protective member disposed at the top of the module of the display device 1, and may be a transparent substrate through which light can be substantially transmitted. The window WIN may have a multilayer structure selected from a glass substrate, a plastic film, and a plastic substrate. The window WIN may include a rigid or flexible substrate, and the material constituting the window WIN is not particularly limited.

Although not shown, the display device 1 may further include a polarizing plate (or another type of antireflection layer) that prevents reflection of external light between the window WIN and the sensor unit 120.

Figure 3:
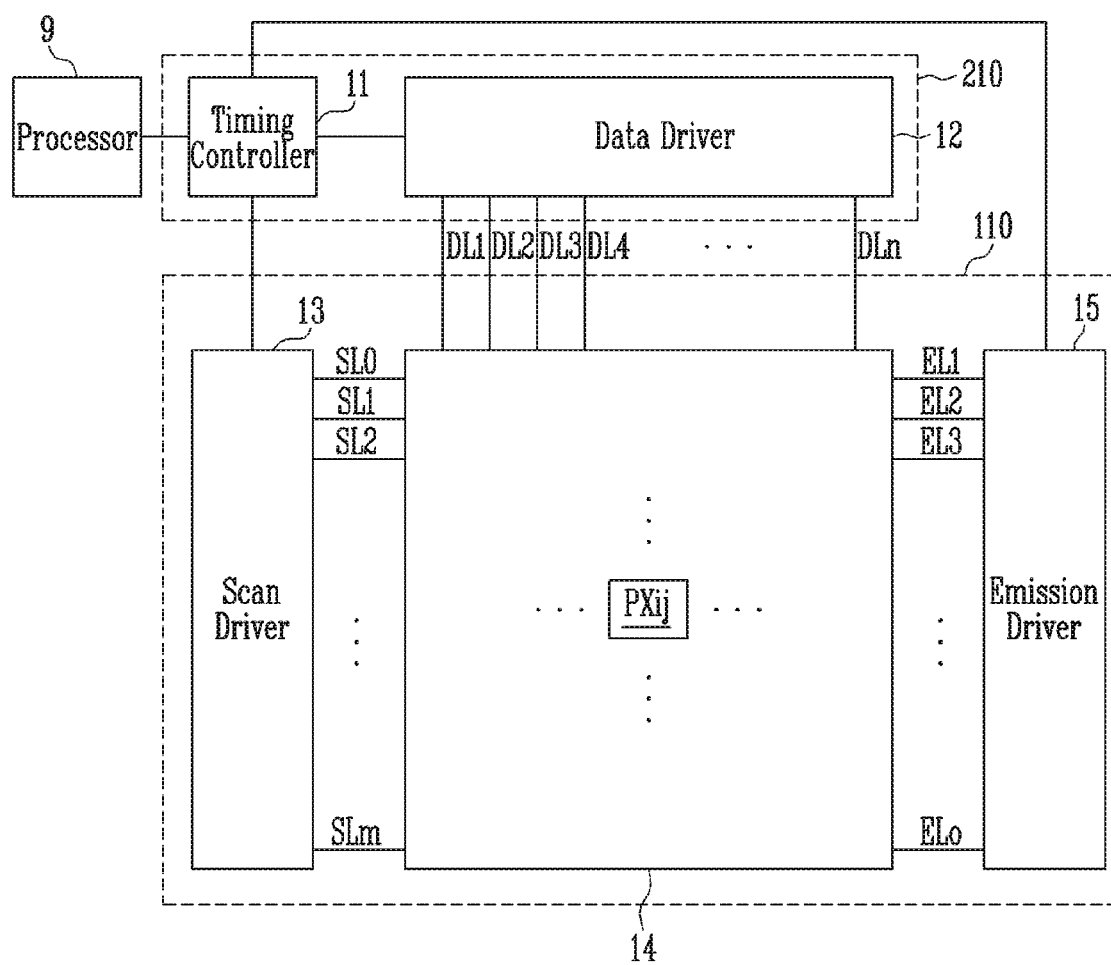
FIGS. 3, 4 and 5 are diagrams for explaining a display unit and a display driver according to an embodiment of the inventive concept.
Figure 4:
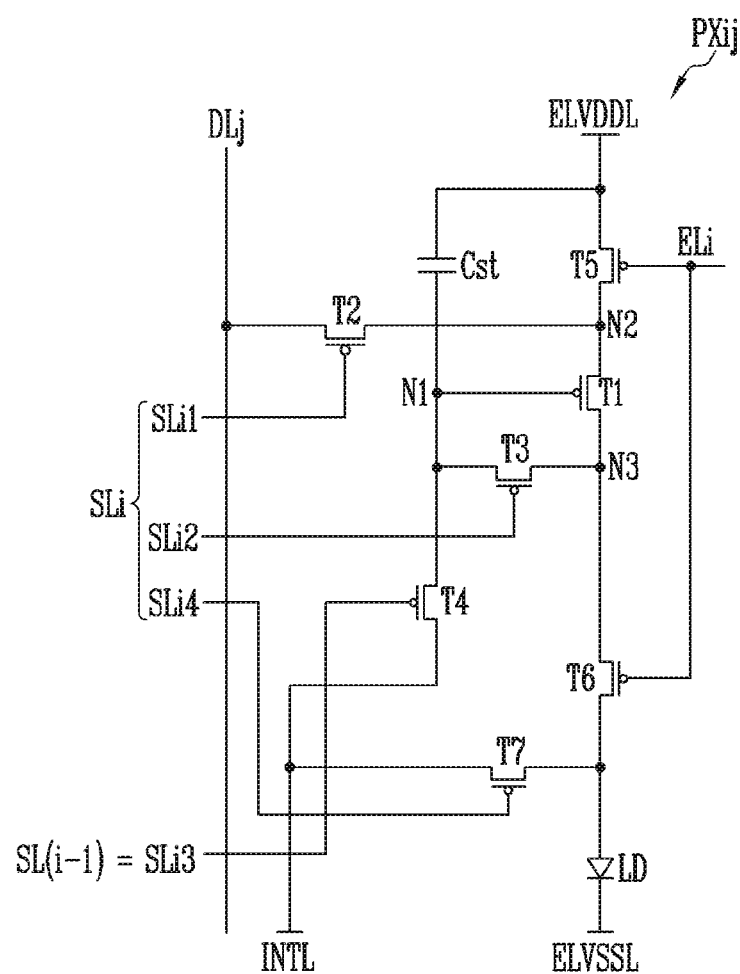
Figure 5:
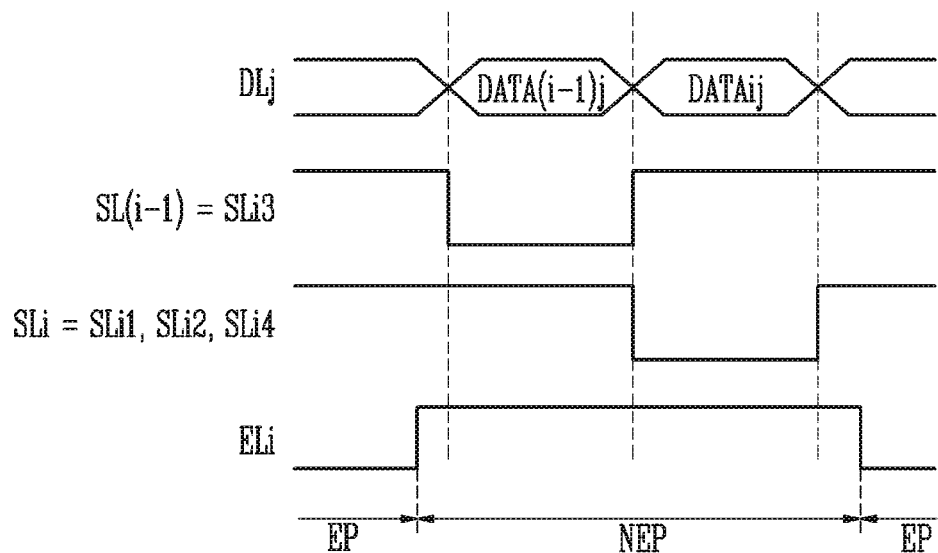

FIGS. 3 to 5 are diagrams for explaining a display unit and a display driver according to an embodiment of the inventive concept.

Referring to FIG. 3, the display driver 210 may include the timing controller 11 and the data driver 12, and the display unit 110 may include a scan driver 13, a pixel unit 14, and an emission driver 15. However, as described above, whether functional units are to be integrated into one IC, to be integrated into a plurality of ICs, or to be mounted on the display substrate 111 may be variously selected according to the specifications of the display device 1.

The timing controller 11 may receive grayscales and timing signals for each display frame period from a processor 9. Here, the processor 9 may correspond to at least one of a graphics processing unit (GPU), a central processing unit (CPU), an application processor (AP), and the like. The timing signals may include a vertical synchronization signal, a horizontal synchronization signal, a data enable signal, and the like.

Each cycle of the vertical synchronization signal may correspond to each display frame period. Each cycle of the horizontal synchronization signal may correspond to each horizontal period. The grayscales may be supplied in units of horizontal lines in each horizontal period in response to a pulse of the enable level of the data enable signal. A horizontal line may mean pixels (for example, a pixel row) connected to the same scan line and emission line.

The timing controller 11 may render the grayscales to correspond to the specifications of the display device 1. For example, the processor 9 may provide a red grayscale, a green grayscale, and a blue grayscale for each unit dot. For example, when the pixel unit 14 has an RGB stripe structure, the pixels may correspond to each grayscale in a one-to-one manner. In this case, rendering of the grayscales may be unnecessary. However, for example, when the pixel unit 14 has a pentile (PENTILE™) structure, since adjacent unit dots share pixels, the pixels may not correspond to each grayscale in a one-to-one manner. In this case, rendering of the grayscales may be required. The rendered or non-rendered grayscales may be provided to the data driver 12. In addition, the timing controller 11 may provide a data control signal to the data driver 12. Also, the timing controller 11 may provide a scan control signal to the scan driver 13 and an emission control signal to the emission driver 15.

The data driver 12 may generate data voltages (that is, data signals) to be provided to data lines DL1, DL2, DL3, DL4, . . . , and DLn using the grayscales and the data control signal received from the timing controller 11, where n may be an integer greater than 0.

The scan driver 13 may generate scan signals to be provided to scan lines SL0, SL1, SL2, . . . , and SLm using the scan control signal (for example, a clock signal, a scan start signal, etc.) received from the timing controller 11. The scan driver 13 may sequentially supply the scan signals having a turn-on level pulse to the scan lines SL0 to SLm. The scan driver 13 may include scan stages configured in the form of a shift register. The scan driver 13 may generate the scan signals by sequentially transferring the scan start signal in the form of a turn-on level pulse to the next scan stage according to the control of the clock signal, where m may be an integer greater than 0.

The emission driver 15 may generate emission signals to be provided to emission lines EL1, EL2, EL3, . . . , and ELo using the emission control signal (for example, a clock signal, an emission stop signal, etc.) received from the timing controller 11. The emission driver 15 may sequentially supply the emission signals having a turn-off level pulse to the emission lines EL1 to ELo. The emission driver 15 may include emission stages configured in the form of a shift register. The emission driver 15 may generate the emission signals by sequentially transmitting the emission stop signal in the form of a turn-off level pulse to the next emission stage according to the control of the clock signal, where o may be an integer greater than 0.

The pixel unit 14 may include the pixels. Each pixel PXij may be connected to a corresponding data line, a corresponding scan line, and a corresponding emission line. The pixels may include pixels emitting light of a first color, pixels emitting light of a second color, and pixels emitting light of a third color. The first color, the second color, and the third color may be different colors. For example, the first color may be one color of red, green, and blue, the second color may be one color other than the first color among red, green, and blue, and the third color may be one color other than the first color and the second color among red, green, and blue. In addition, magenta, cyan, and yellow may be used as the first to third colors instead of red, green, and blue.

FIG. 4 is a diagram for explaining a pixel according to an embodiment of the inventive concept.

Referring to FIG. 4, the pixel PXij may include transistors T1, T2, T3, T4, T5, T6, and T7, a storage capacitor Cst, and a light emitting element LD.

Hereinafter, a circuit composed of P-type transistors will be described as an example. However, those skilled in the art will be able to design a circuit composed of N-type transistors by changing the polarity of a voltage applied to a gate terminal. Similarly, those skilled in the art will be able to design a circuit composed of a combination of P-type transistors and N-type transistors. A P-type transistor may generally refer to a transistor in which the amount of current increases when a voltage difference between a gate electrode and a source electrode increases in a negative direction. An N-type transistor may generally refer to a transistor in which the amount of current increases when a voltage difference between a gate electrode and a source electrode increases in a positive direction. The transistors may be configured in various forms, such as a thin film transistor (TFT), a field effect transistor (FET), or a bipolar junction transistor (BJT).

A first transistor T1 may have a gate electrode connected to a first node N1, a first electrode connected to a second node N2, and a second electrode connected to a third node N3. The first transistor T1 may be referred to as a driving transistor.

A second transistor T2 may have a gate electrode connected to a scan line SLi1, a first electrode connected to a data line DLj, and a second electrode connected to the second node N2. The second transistor T2 may be referred to as a scan transistor.

A third transistor T3 may have a gate electrode connected to a scan line SLi2, a first electrode connected to the first node N1, and a second electrode connected to the third node N3. The third transistor T3 may be referred to as a diode-connected transistor.

A fourth transistor T4 may have a gate electrode connected to a scan line SLi3, a first electrode connected to the first node N1, and a second electrode connected to an initialization line INTL. The fourth transistor T4 may be referred to as a gate initialization transistor.

A fifth transistor T5 may have a gate electrode connected to an i-th emission line ELi, a first electrode connected to a first power source line ELVDDL, and a second electrode connected to the second node N2. The fifth transistor T5 may be referred to as an emitting transistor. In another embodiment, the gate electrode of the fifth transistor T5 may be connected to an emission line different from an emission line connected to a gate electrode of a sixth transistor T6.

The sixth transistor T6 may have the gate electrode connected to the i-th emission line ELi, a first electrode connected to the third node N3, and a second electrode connected to an anode of the light emitting element LD. The sixth transistor T6 may be referred to as an emission transistor. In another embodiment, the gate electrode of the sixth transistor T6 may be connected to an emission line different from the emission line connected to the gate electrode of the fifth transistor T5.

A seventh transistor T7 may have a gate electrode connected to a scan line SLi4, a first electrode connected to the initialization line INTL, and a second electrode connected to the anode of the light emitting element LD. The seventh transistor T7 may be referred to as a light emitting element initialization transistor.

A first electrode of the storage capacitor Cst may be connected to the first power source line ELVDDL, and a second electrode of the storage capacitor Cst may be connected to the first node N1.

The light emitting element LD may have the anode connected to the second electrode of the sixth transistor T6 and a cathode connected to a second power source line ELVSSL. The light emitting element LD may be a light emitting diode. The light emitting element LD may be composed of an organic light emitting diode, an inorganic light emitting diode, a quantum dot/well light emitting diode, or the like. The light emitting element LD may emit light of any one of the first color, the second color, and the third color. In addition, although only one light emitting element LD is provided in each pixel in the present embodiment, a plurality of light emitting elements may be provided in each pixel in another embodiment. In this case, the plurality of light emitting elements may be connected in series, in parallel, or in series and parallel.

A first power source voltage may be applied to the first power source line ELVDDL, and a second power source voltage may be applied to the second power source line ELVSSL. An initialization voltage may be applied to the initialization line INTL. For example, the first power source voltage may be greater than the second power source voltage. For example, the initialization voltage may be equal to or greater than the second power source voltage. For example, the initialization voltage may correspond to a data voltage having the smallest amplitude among the data voltages that can be provided. In another example, the amplitude of the initialization voltage may be smaller than amplitudes of the data voltages that can be provided.

FIG. 5 is a diagram for explaining an example of a method of driving the pixel of FIG. 4.

Hereinafter, for convenience of description, it is assumed that the scan lines SLi1, SLi2, and SLi4 are the i-th scan line SLi, and the scan line SLi3 is an (i−1)th scan line SL(i−1). However, the connection relationship of the scan lines SLi1, SLi2, SLi3, and SLi4 may be variously changed according to embodiments. For example, the scan line SLi4 may be the (i−1)th scan line or an (i+1)th scan line.

First, an emission signal of a turn-off level (logic high level) may be applied to the i-th emission line ELi, a data voltage DATA(i−1)j for an (i−1)th pixel may be applied to the data line DLj, and a scan signal of a turn-on level (logic low level) may be applied to the scan line SLi3. High/low at the logic level may vary depending on whether the transistor is P-type or N-type.

In this case, since a scan signal of a turn-off level is applied to the scan lines SLi1 and SLi2, the second transistor T2 may be in a turned-off state, and the data voltage DATA(i−1)j for the (i−1)th pixel is prevented from being applied to the pixel PXij.

In this case, since the fourth transistor T4 is in a turned-on state, the first node N1 may be connected to the initialization line INTL to initialize a voltage of the first node N1. Since the emission signal of the turn-off level is applied to the emission line ELi, the transistors T5 and T6 may be in the turned-off state, and unnecessarily light emitting of the light emitting element LD according to the process of applying the initialization voltage can be prevented.

Next, a data voltage DATAij for an i-th pixel PXij may be applied to the data line DLj, and a scan signal of the turn-on level may be applied to the scan lines SLi1 and SLi2.

Accordingly, the transistors T2, T1, and T3 may be in the turned-on state, and the data line DLj and the first node N1 may be electrically connected to each other. Accordingly, a compensation voltage obtained by subtracting a threshold voltage of the first transistor T1 from the data voltage DATAij may be applied to the second electrode of the storage capacitor Cst (that is, the first node N1), and the storage capacitor Cst may maintain a voltage corresponding to a difference between the first power source voltage and the compensation voltage. This period may be referred to as a threshold voltage compensation period or a data writing period.

Also, when the scan line SLi4 is the i-th scan line, since the seventh transistor T7 may be in the turned-on state, the anode of the light emitting element LD and the initialization line INTL may be connected to each other, and the light emitting element LD may be initialized with the amount of charge corresponding to a voltage difference between the initialization voltage and the second power source voltage.

Thereafter, as an emission signal of a turn-on level is applied to the i-th emission line ELI, the transistors T5 and T6 may be turned on. Accordingly, a driving current path connecting the first power source line ELVDDL, the fifth transistor T5, the first transistor T1, the sixth transistor T6, the light emitting element LD, and the second power source line ELVSSL may be formed.

The amount of driving current flowing through the first electrode and the second electrode of the first transistor T1 may be adjusted according to the voltage maintained in the storage capacitor Cst. The light emitting element LD may emit light with a luminance corresponding to the amount of driving current. The light emitting element LD may emit light until an emission signal of the turn-off level is applied to the emission line ELI.

When the emission signal is at the turn-on level, pixels receiving the emission signal may be in a display state. Accordingly, a period in which the emission signal is at the turn-on level may be referred to as an emission period EP (or an emission allowable period). Also, when the emission signal is at the turn-off level, pixels receiving the emission signal may be in a non-display state. Accordingly, a period in which the emission signal is at the turn-off level may be referred to as a non-emission period NEP (or a period during which light emitting is not allowed).

The non-emission period NEP described in FIG. 5 may be a period for preventing the pixel PXij from emitting light with an undesired luminance during an initialization period and the data writing period.

One or more non-emission periods NEP may be additionally provided while data written in the pixel PXij is maintained (for example, one frame period). This may be to effectively express a low grayscale by reducing the emission period EP of the pixel PXij, or to smoothly blur the motion of an image.

Figure 6:
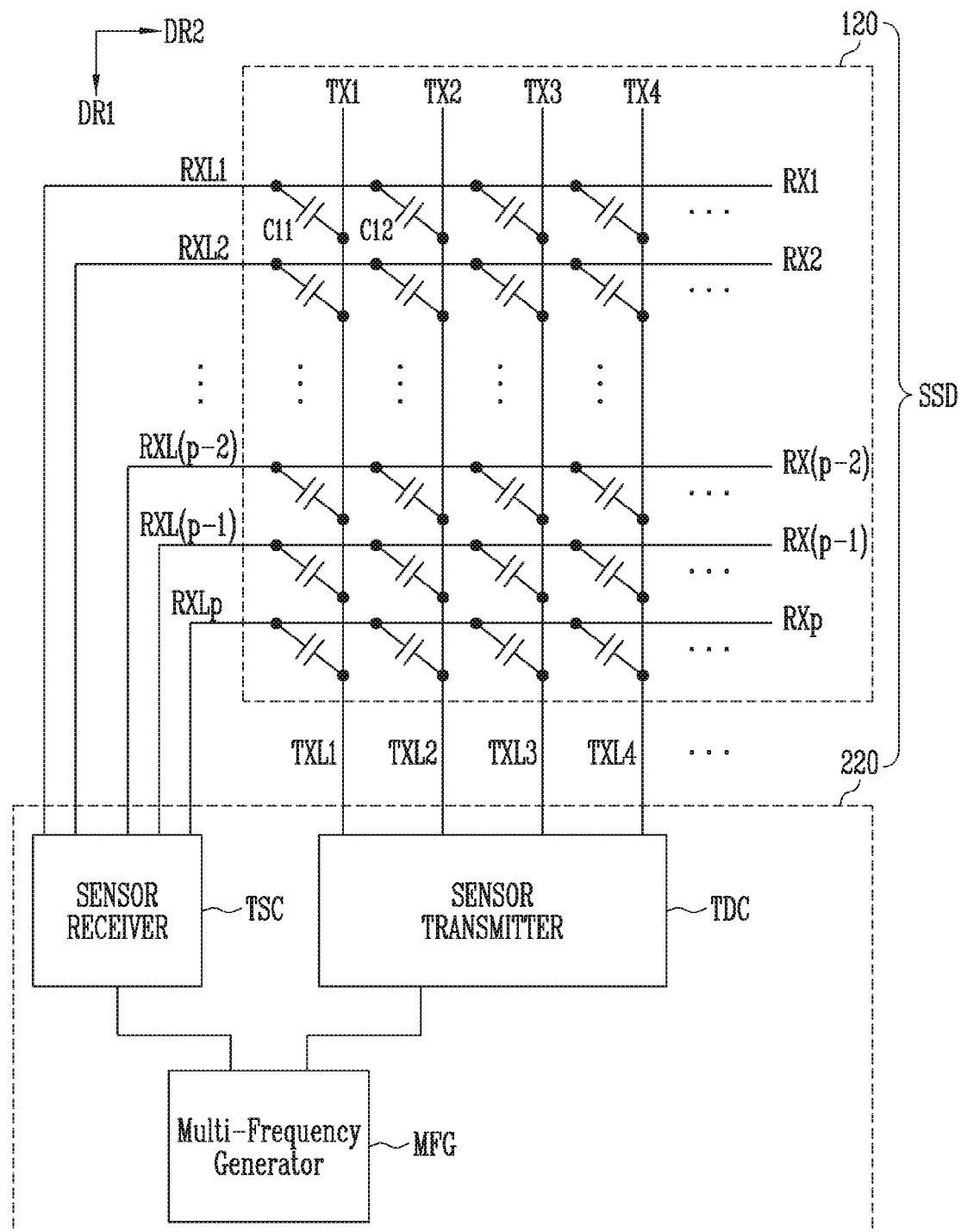
FIG. 6 is a diagram for explaining a sensor device according to an embodiment of the inventive concept.

FIG. 6 is a diagram for explaining a sensor device according to an embodiment of the inventive concept.

Referring to FIG. 6, a sensor device SSD according to an embodiment of the inventive concept may include the sensor unit 120 and the sensor driver 220. The sensor device SSD may be included in the display device 1, but the sensor device SSD may be configured as a product separate and independent of the display device 1.

The sensor unit 120 may include first sensors TX1, TX2, TX3, TX4, . . . and second sensors RX1, RX2, . . . , RX(p−2), RX(p−1), and RXp, where p may be an integer greater than 0. The first sensors TX1 to TX4 may extend in the first direction DR1 and may be arranged in the second direction DR2. The second sensors RX1 to RXp may extend in the second direction DR2 and may be arranged in the first direction DR1. The second sensors RX1 to RXp may intersect the first sensors TX1 to TX4. The first sensors TX1 to TX4 and the second sensors RX1 to RXp may form mutual capacitance. For example, a capacitance C11 may be formed between a first sensor TX1 and a second sensor RX1, and a capacitance C12 may be formed between a first sensor TX2 and the second sensor RX1. The sensor driver 220 may determine whether there is a user's touch input by detecting a change in the capacitances C11 and C12.

The sensor driver 220 may include a sensor transmitter TDC, a sensor receiver TSC, and a multi-frequency generator MFG. The multi-frequency generator MFG may generate a plurality of frequency signals having different respective frequencies. For example, the multi-frequency generator MFG may generate a first frequency signal and a second frequency signal having different respective frequencies. To generate the plurality of frequency signals, the multi-frequency generator MFG may be implemented as a conventional Numerically Controlled Oscillator (NCO). In an example, the multi-frequency generator MFG is implemented by using the same number of oscillators as the number of frequency signals.

The sensor transmitter TDC may be connected to the first sensors TX1 to TX4 and supply driving signals to the first sensors TX1 to TX4. The sensor transmitter TDC may be connected to the first sensors TX1 to TX4 through first sensor lines TXL1, TXL2, TXL3, and TXL4.

The sensor receiver TSC may be connected to the second sensors RX1 to RXp and receive sensing signals from the second sensors RX1 to RXp. The sensor receiver TSC may be connected to the second sensors RX1 to RXp through second sensor lines RXL1, RXL2, . . . , RXL(p−2), RXL(p−1), and RXLp.

For example, the sensor device SSD may achieve a high touch report rate by simultaneously supplying the driving signals to all the first sensors TX1 to TX4. Hereinafter, for convenience of description, it is assumed that the first sensors of the sensor unit 120 are configured of first sensors of a first group and first sensors of a second group. In other examples, the sensor unit 120 is composed of three or more groups of first sensors.

The sensor transmitter TDC may supply first driving signals based on the first frequency signal to the first sensors of the first group among the first sensors TX1 to TX4. Also, the sensor transmitter TDC may supply second driving signals based on the second frequency signal to the first sensors of the second group among the first sensors TX1 to TX4. In this case, the sensor transmitter TDC may simultaneously supply the first driving signals and the second driving signals.

The sensor receiver TSC may simultaneously receive sensing signals from the second sensors RX1 to RXp. The sensor receiver TSC may achieve a high touch report rate by simultaneously receiving and processing (demodulating, filtering, etc.) the sensing signals of various frequencies. A detailed example configuration and operation of the sensor driver 220 will be further described below with reference to FIGS. 7 to 9.

Figure 7:
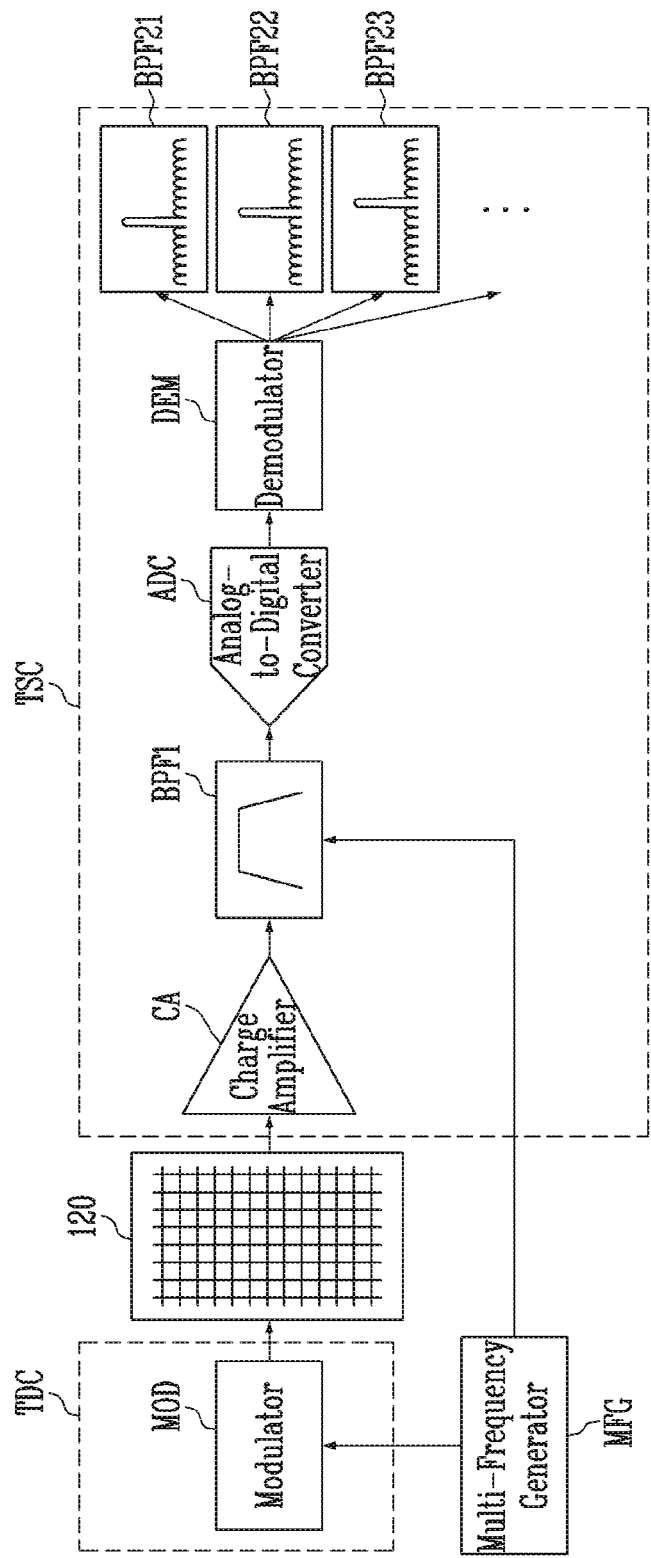
FIG. 7 is a diagram for explaining a sensor transmitter and a sensor receiver according to an embodiment of the inventive concept.
Figure 8:
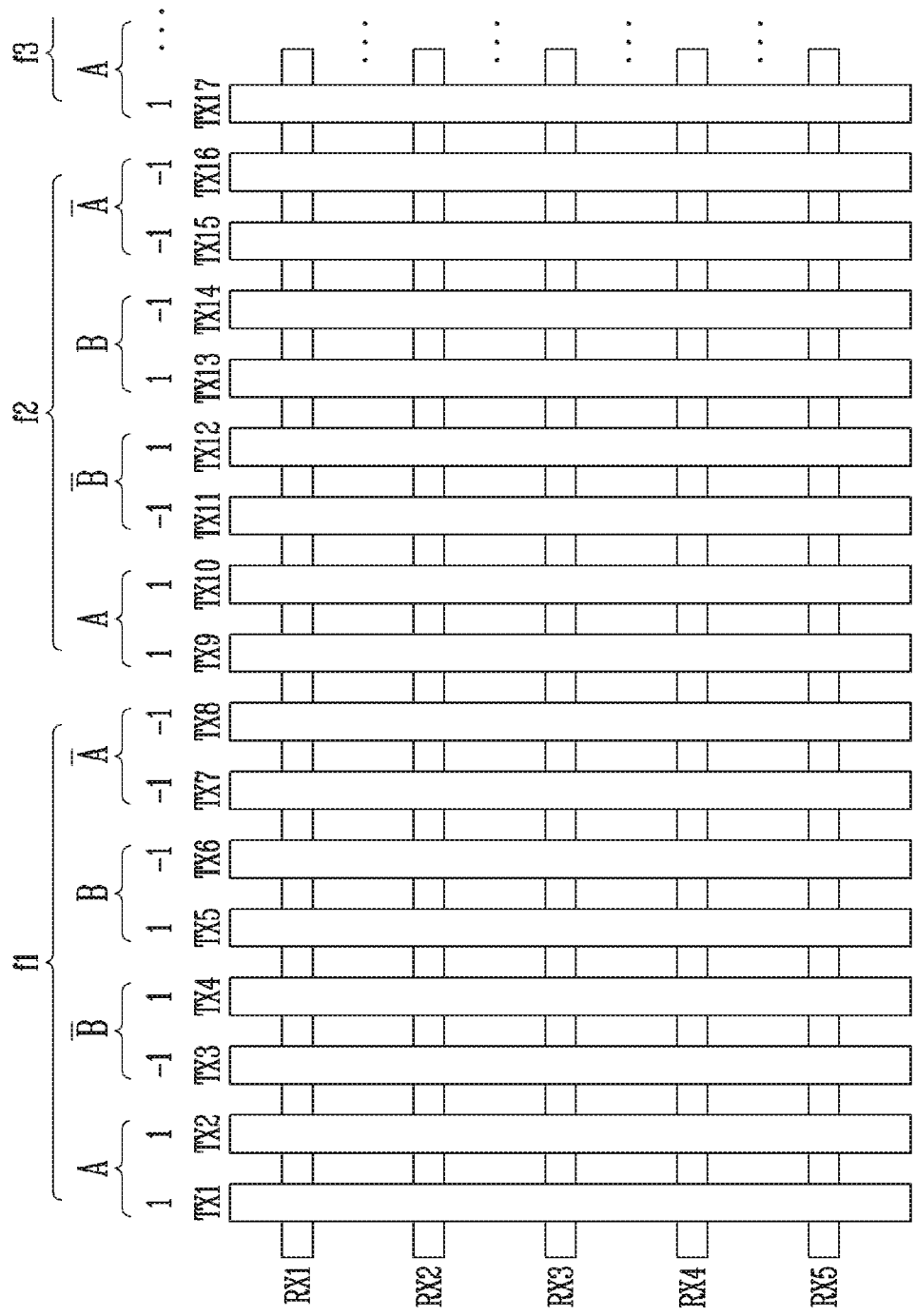
FIG. 8 is a diagram for explaining a method of modulating driving signals according to an embodiment of the inventive concept.
Figure 9:
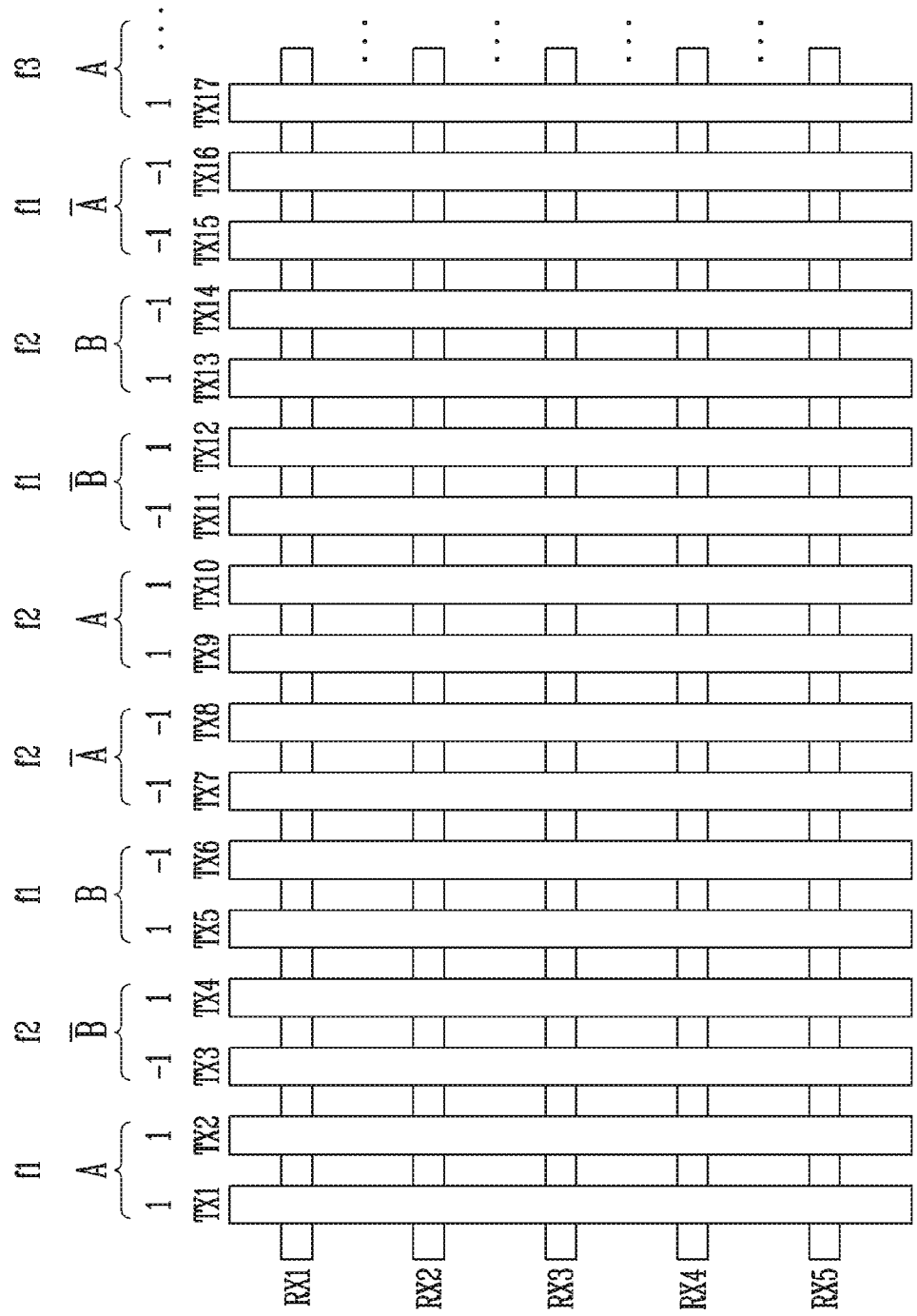
FIG. 9 is a diagram for explaining a method of modulating driving signals according to another embodiment of the inventive concept.

FIG. 7 is a diagram for explaining a sensor transmitter and a sensor receiver according to an embodiment of the inventive concept. FIG. 8 is a diagram for explaining a method of modulating driving signals according to an embodiment of the inventive concept. FIG. 9 is a diagram for explaining a method of modulating driving signals according to another embodiment of the inventive concept.

The sensor transmitter TDC according to an embodiment of the inventive concept may include a modulator MOD. The modulator MOD may generate driving signals of a plurality of groups. The plurality of groups may correspond to the plurality of frequency signals, and thus frequencies of the plurality of groups may differ from one another. According to an embodiment, frequencies of the plurality of frequency signals may be orthogonal to each other, which means that the driving signals of the plurality of groups may not affect each other during a sensing process. For example, the frequencies of the plurality of frequency signals may not be integer multiples of each other.

In this case, the number and type of the driving signals constituting each group may be the same. For example, the modulator MOD may modulate the groups in the same manner. Thus, the plurality of groups may have different frequencies and may be modulated in the same manner.

For example, the modulator MOD may generate (that is, modulate) one group of driving signals according to the following first matrix. In this case, the modulator MOD may generate (that is, modulate) different groups of driving signals in the same manner using the first matrix.

$$\begin{bmatrix} A & \overline{B} & B & \overline{A} \\ \overline{A} & A & \overline{B} & B \\ B & \overline{A} & A & \overline{B} \\ \overline{B} & B & \overline{A} & A \end{bmatrix}$$ [First Matrix]

Here, elements of each row of the first matrix may indicate codes applied to transmission channels of the sensor transmitter TDC at each time point. For use as differential signals, the codes may be composed of non-inverting codes (A, B) and inverting codes ($\overline{A}$, $\overline{B}$). For example, the non-inverting codes (A, B) may be orthogonal codes. For example, the non-inverting codes (A, B) may be generated by conventional code modulation methods such as Hadamard and Modified Hadamard. These codes may be derived by the operation of the modulator MOD or may be stored in advance in a lookup table.

For example, the non-inverting code (A) may be (1, 1), the non-inverting code (B) may be (1, −1), the inverting code ($\overline{A}$) may be (−1, −1), and the inverting code ($\overline{B}$) may be (−1, 1). For example, if (1) in each code is a sine wave having a first phase, (−1) in each code may be a sine wave having a second phase. For example, the first phase may differ from the second phase by 180 degrees. For example, if a driving signal at (1) has a waveform of sin(wt), a driving signal at (−1) may have a waveform of (−)sin(wt). Meanwhile, if the driving signal at (1) has a waveform of cos(wt), the driving signal at (−1) may have a waveform of (−)cos(wt). Meanwhile, in the non-inverting code (A), (1) may indicate sin(wt), and (−1) may indicate (−)sin(wt). In the non-inverting code (B), (1) may indicate cos(wt), and (−1) may indicate (−)cos(wt).

Referring to FIG. 8, driving signals applied to the plurality of first sensors TX1, TX2, TX3, TX4, TX5, TX6, TX7, TX8, TX9, TX10, TX11, TX12, TX13, TX14, TX15, TX16, and TX17 at a first time point are shown as an example. The second sensors RX1, RX2, RX3, RX4, and RX5 may be arranged to intersect the first sensors TX1 to TX17.

For example, the modulator MOD may generate the first driving signals to have the first phase or the second phase based on a first frequency signal f1, and generate the second driving signals to have the first phase or the second phase based on a second frequency signal f2. In this case, a ratio in which the first driving signals have the first phase or the second phase may be the same as a ratio in which the second driving signals have the first phase or the second phase. For example, the first phase and the second phase may have a difference of 180 degrees from each other.

The sensor transmitter TDC may supply the first driving signals based on the first frequency signal f1 to the first sensors TX1, TX2, TX3, TX4, TX5, TX6, TX7, and TX8 of the first group among the first sensors TX1 to TX17. For example, the sensor transmitter TDC may supply sine waves having the first phase and a first frequency of the first frequency signal f1 to the first sensors TX1, TX2, TX4, and TX5 as the first driving signals. Meanwhile, the sensor transmitter TDC may supply sine waves having the second phase and the first frequency of the first frequency signal f1 to the first sensors TX3, TX6, TX7, and TX8 as the first driving signals.

The sensor transmitter TDC may supply the second driving signals based on the second frequency signal f2 to the first sensors TX9, TX10, TX11, TX12, TX13, TX14, TX15, and TX16 of the second group among the first sensors TX1 to TX17. For example, the sensor transmitter TDC may supply sine waves having the first phase and a second frequency of the second frequency signal f2 to the first sensors TX9, TX10, TX12, and TX13 as the second driving signals. Meanwhile, the sensor transmitter TDC may supply sine waves having the second phase and the second frequency of the second frequency signal f2 to the first sensors TX11, TX14, TX15, and TX16 as the second driving signals.

The sensor transmitter TDC may simultaneously supply the first driving signals and the second driving signals. FIG. 8 shows a case in which driving signals corresponding to a first row of the first matrix are supplied at the first time point.

Meanwhile, the sensor transmitter TDC may generate third driving signals to have the first phase or a third phase based on a third frequency signal f3, and simultaneously supply the first driving signals, the second driving signals, and the third driving signals. Thus, embodiments of the inventive concept can be implemented with any suitable number of frequency signals supplied by the multi-frequency generator MFG.

A column direction of the first matrix may indicate a temporal order. For example, at a second time point which is a time point following the first time point, the driving signals may be modulated to correspond to codes corresponding to a second row ($\overline{A}$ A $\overline{B}$ B) of the first matrix and supplied to the first sensors TX1 to TX17. In addition, at a third time point which is a time point following the second time point, the driving signals may be modulated to) correspond to codes corresponding to a third row (B $\overline{A}$ A $\overline{B}$) of the first matrix and supplied to the first sensors TX1 to TX17. In addition, at a fourth time point in which is a time point following the third time point, the driving signals may be modulated to correspond to codes corresponding to a fourth row ($\overline{B}$ B $\overline{A}$ A) of the first matrix and supplied to the first sensors TX1 to TX17.

At each time point, since the driving signals are supplied as differential signals, at least two of the first driving signals may have inverted waveforms with respect to each other, and at least two of the second driving signals may have inverted waveforms with respect to each other. Meanwhile, in an embodiment, when all codes are represented by differential signals, the sum of amplitudes of the first driving signals may be 0, and the sum of amplitudes of the second driving signals may be 0.

In other embodiments, the modulator MOD generates each group of driving signals according to the following second matrix or third matrix below.

$$\begin{bmatrix} A & \bar{C} & C & \bar{B} & B & \bar{A} \\ \bar{A} & A & \bar{C} & C & \bar{B} & B \\ B & \bar{A} & A & \bar{C} & C & \bar{B} \\ \bar{B} & B & \bar{A} & A & \bar{C} & C \\ C & \bar{B} & B & \bar{A} & A & \bar{C} \\ \bar{C} & C & \bar{B} & B & \bar{A} & A \end{bmatrix}$$ [Second Matrix]

$$\begin{bmatrix} A & \bar{D} & D & \bar{C} & C & \bar{B} & B & \bar{A} \\ \bar{A} & A & \bar{D} & D & \bar{C} & C & \bar{B} & B \\ B & \bar{A} & A & \bar{D} & D & \bar{C} & C & \bar{B} \\ \bar{B} & B & \bar{A} & A & \bar{D} & D & \bar{C} & C \\ C & \bar{B} & B & \bar{A} & A & \bar{D} & D & \bar{C} \\ \bar{C} & C & \bar{B} & B & \bar{A} & A & \bar{D} & D \\ D & \bar{C} & C & \bar{B} & B & \bar{A} & A & \bar{D} \\ \bar{D} & D & \bar{C} & C & \bar{B} & B & \bar{A} & A \end{bmatrix}$$ [Third Matrix]

As the number of elements constituting the matrix increases, the number of necessary frequency signals f1, f2, f3, . . . (equaling the number of groups) may decrease, but a longer sensing time may be required (the number of rows, that is, the number of necessary time points may increase).

The sensor receiver TSC according to an embodiment of the inventive concept may include a charge amplifier CA, a first band pass filter BPF1, an analog-to-digital converter ADC, a demodulator DEM, and second band pass filters BPF21, BPF22, and BPF23.

The charge amplifier CA may have an input terminal coupled to at least one of the second sensors. For example, when the charge amplifier CA is configured as a single-ended input, one of the second sensors may be coupled to the input terminal of the charge amplifier CA. In this case, the charge amplifier CA may amplify and output a signal corresponding to a difference between a reference voltage and a sensing signal received from a second sensor. In another example, when the charge amplifier CA is configured as a differential input, two adjacent second sensors may be coupled to input terminals of the charge amplifier CA. In this case, the charge amplifier CA may amplify and output a signal corresponding to a difference between sensing signals received from the adjacent second sensors. When the charge amplifier CA is configured as the differential input, it may be advantageous to remove common noise, but an additional calculation process after digital signal conversion may be required to obtain a sensing value of each coordinate.

The first band pass filter BPF1 may filter other frequency signals corresponding to noise except for frequency signals of interest.

For example, the first band pass filter BPF1 may receive an output signal of the charge amplifier CA and receive at least one frequency signal from the multi-frequency generator MFG. The type of the frequency signal received by the first band-pass filter BPF1 may vary according to the type of the first band-pass filter BPF1. For example, the first band pass filter BPF1 may receive a center frequency signal of the plurality of frequency signals. For example, the first band pass filter BPF1 may receive a center frequency signal corresponding to a center frequency of the frequency of the first frequency signal and the frequency of the second frequency signal. In this case, the first band pass filter BPF1 may have a relatively wide pass band based on the center frequency signal. In this case, the expression "relatively wide" may mean that it is wide based on each of pass bands of the second band pass filters BPF21, BPF22, and BPF23 to be described later.

In another example, the first band pass filter BPF1 may receive all of the plurality of frequency signals and may have pass bands corresponding to each of the frequency signals. For example, the first band pass filter BPF1 may receive the first frequency signal and the second frequency signal, and may have pass bands corresponding to the first frequency signal and the second frequency signal.

The analog-to-digital converter ADC may convert an output signal of the first band pass filter BPF1 into a digital signal. Since a conventional configuration can be employed as the analog-to-digital converter ADC, a detailed description thereof will be omitted. The analog-to-digital converter ADC may be designed integrally with the first band-pass filter BPF1 to constitute one block (for example, a band-pass sigma-delta analog-to-digital converter).

The demodulator DEM may demodulate an output signal of the analog-to-digital converter ADC. The demodulator DEM may know in advance which codes the modulator MOD uses. Accordingly, the demodulator DEM may output a position corresponding to which code the touch is made. For example, since the driving signals at each time point are composed of differential signals, when an input signal of the demodulator DEM has an amplitude of "0", it may be determined that there is no user's touch.

On the other hand, for example, when the user's touch is made at an intersection of the first sensors TX5 and TX6 and the second sensor RX3 at the first time point, a sensing signal corresponding to the non-inverting code (B) may be reduced by the reduced mutual capacitance, and an input signal corresponding to the inverting code ($\bar{B}$) may be input to the demodulator DEM of a reception channel connected to the second sensor RX3. Accordingly, the demodulator DEM of the reception channel connected to the second sensor RX3 may output, as an output signal, that the user's touch is made at a position corresponding to the non-inverting code (B). However, in this step, the demodulator DEM may be unable to determine whether the user's touch is made at the intersection of the first sensors TX5 and TX6 and the second sensor RX3 corresponding to the first group, or whether the user's touch is made at an intersection of the first sensors TX13 and TX14 and the second sensor RX3 corresponding to the second group.

The plurality of second band pass filters BPF21, BPF22, and BPF23 may receive an output signal of the demodulator DEM. Pass bands of the second band pass filters BPF21, BPF22, and BPF23 may differ from one another. The pass bands of the second band pass filters BPF21, BPF22, and BPF23 may correspond to frequencies of the plurality of frequency signals f1, f2, and f3. For example, a pass band of one BPF21 of the second band pass filters BPF21, BPF22, and BPF23 may include the dominant frequency of the first frequency signal f1 as the center frequency, and a pass band of the other one BPF22 of the second band pass filters BPF21, BPF22, and BPF23 may include the dominant frequency of the second frequency signal f2 as the center frequency.

Accordingly, since the second band pass filter BPF21 outputs a signal other than "0" and the second band pass filter BPF22 outputs a signal of "0", the sensor driver 220 may determine that the user's touch is made at the intersection of the first sensors TX5 and TX6 and the second sensor RX3.

Meanwhile, in the above description, a method of determining the touch position based on the driving signals at the first time point has been mainly described. However, in order to improve accuracy, it may be desirable to use accumulated output signals of a plurality of time points. For example, if some of the non-inverting codes are identical, it may be desirable to use the accumulated output signals of the plurality of time points.

Referring to FIG. 8, a first sensor of another group may not be located between the first sensors TX1 to TX8 of the first group, and a first sensor of another group may not be located between the first sensors TX9 to TX16 of the second group.

However, as shown in FIG. 9, the first sensors of the first group may form first sub-groups (TX1, TX2), (TX5, TX6), (TX11, TX12), and (TX15, TX16) by at least two, and a first sensor of another group may not be located within each of the first sub-groups (TX1, TX2), (TX5, TX6), (TX11, TX12), and (TX15, TX16). Here, a sub-group may mean the first sensors corresponding to the same code. Meanwhile, a first sensor of another group may be located between the first sub-groups (TX1, TX2), (TX5, TX6), (TX11, TX12), and (TX15, TX16).

In addition, the first sensors of the second group may form second sub-groups (TX3, TX4), (TX7, TX8), (TX9, TX10), and (TX13, TX14) by at least two, and a first sensor of another group may not be located within each of the second sub-groups (TX3, TX4), (TX7, TX8), (TX9, TX10), and (TX13, TX14). Meanwhile, a first sensor of another group may be located between the second sub-groups (TX3, TX4), (TX7, TX8), (TX9, TX10), and (TX13, TX14). The first sub-groups and the second sub-groups may be alternately arranged.

In the above embodiments, when the difference in frequency and code is maintained for the first sensors, positions of the first sensors to which the driving signals are supplied may be determined differently from embodiment to embodiment in consideration of differing circuit complexity and efficiency.

In conventional touch sensor devices, touch sensing is typically performed by applying, during each sensing time period, a driving signal to one first sensor (e.g., column sensor) at a time (i.e., sequentially), and when each first sensor receives a driving signal, signals output by the second sensors (e.g., row sensors) are measured row by row. The sensor device and the driving method thereof according to the inventive concept, however, can achieve a high touch report rate (achieve faster sensing) and realize other advantages by simultaneously supplying the driving signals to the first sensors.

Embodiments have been disclosed hereinabove for illustrative purposes only and are not intended to limit the scope of the inventive concept as set forth in the claims. Therefore, those skilled in the art will appreciate that various modifications and equivalent embodiments are possible without departing from the scope of the inventive concept as defined by the appended claims and their equivalents.

What is claimed is:

1. A sensor device comprising:
   first sensors;
   second sensors forming capacitance with the first sensors;
   a multi-frequency generator generating a first frequency signal and a second frequency signal having different frequencies;
   a sensor transmitter supplying first driving signals based on the first frequency signal to first sensors of a first group among the first sensors and simultaneously supplying second driving signals based on the second frequency signal to first sensors of a second group among the first sensors; and
   a sensor receiver simultaneously receiving sensing signals from the second sensors,
   wherein each two or more first sensors of the first group forms each of first sub-groups, a first sensor of another group is not located within the first sub-groups, and a first sensor of another group is located between the first sub-groups.

2. The sensor device of claim 1, wherein no first sensor of any other group is located within the first sub-groups.

3. The sensor device of claim 1, wherein at least two of the first driving signals have inverted waveforms from each other, and
   wherein at least two of the second driving signals have inverted waveforms from each other.

4. The sensor device of claim 3, wherein a sum of amplitudes of the first driving signals is 0, and
   wherein a sum of amplitudes of the second driving signals is 0.

5. The sensor device of claim 1, wherein the sensor transmitter includes:
   a modulator generating the first driving signals to have a first phase or a second phase based on the first frequency signal and generating the second driving signals to have the first phase or the second phase based on the second frequency signal.

6. The sensor device of claim 5, wherein a ratio in which the first driving signals have the first phase or the second phase is the same as a ratio in which the second driving signals have the first phase or the second phase.

7. The sensor device of claim 1, wherein the sensor receiver includes:
   a charge amplifier having an input terminal coupled to at least one of the second sensors; and
   a first band pass filter receiving an output signal of the charge amplifier and receiving at least one frequency signal from the multi-frequency generator.

8. A sensor device comprising:
   first sensors;
   second sensors forming capacitance with the first sensors;
   a multi-frequency generator generating a first frequency signal and a second frequency signal having different frequencies;
   a sensor transmitter supplying first driving signals based on the first frequency signal to first sensors of a first group among the first sensors and simultaneously supplying second driving signals based on the second frequency signal to first sensors of a second group among the first sensors; and
   a sensor receiver simultaneously receiving sensing signals from the second sensors,
   wherein the sensor receiver includes:
   a charge amplifier having an input terminal coupled to at least one of the second sensors; and
   a band pass filter receiving an output signal of the charge amplifier and receiving at least one frequency signal from the multi-frequency generator,
   wherein the band pass filter receives at least one of: (i) a center frequency signal of the first frequency signal and the second frequency signal; or (ii) the first frequency signal and the second frequency signal.

9. The sensor device of claim 8, wherein the band pass filter receives the center frequency signal of the first frequency signal and the second frequency signal.

10. The sensor device of claim 9, wherein the band pass filter has a pass band based on the center frequency signal.

11. The sensor device of claim 7, wherein the band pass filter is a first band pass filter, and the sensor receiver further includes:
- an analog-to-digital converter converting an output signal of the first band pass filter into a digital signal;
- a demodulator demodulating an output signal of the analog-to-digital converter; and
- a plurality of second band pass filters receiving an output signal of the demodulator.

12. The sensor device of claim 11, wherein pass bands of the second band pass filters are different from each other.

13. The sensor device of claim 12, wherein a pass band of one of the second band pass filters has a frequency of the first frequency signal as a center frequency, and
wherein a pass band of another one of the second band pass filters has a frequency of the second frequency signal as a center frequency.

14. The sensor device of claim 1, wherein each two or more first sensors of the second group forms each of second sub-groups, a first sensor of another group is not located within the second sub-groups, and a first sensor of another group is located between the second sub-groups.

15. The sensor device of claim 14, wherein the first sub-groups and the second sub-groups are alternately arranged.

16. The sensor device of claim 8, wherein the band pass filter receives the first frequency signal and the second frequency signal.

17. The sensor device of claim 16, wherein the band pass filter has pass bands corresponding to the first frequency signal and the second frequency signal.

18. A driving method of a sensor device including first sensors and second sensors forming capacitance with the first sensors, comprising:
- generating a first frequency signal and a second frequency signal having different frequencies;
- supplying first driving signals based on the first frequency signal to first sensors of a first group among the first sensors and simultaneously supplying second driving signals based on the second frequency signal to first sensors of a second group among the first sensors; and
- simultaneously receiving sensing signals from the second sensors,
wherein each two or more first sensors of the first group forms each of first sub-groups, and a first sensor of another group is not located within the first sub-groups,
wherein each two or more first sensors of the second group forms each of second sub-groups, and a first sensor of another group is not located within the second sub-groups, and
wherein the first sub-groups and the second sub-groups are alternately arranged.

19. The driving method of claim 18, wherein at least two of the first driving signals have inverted waveforms from each other, and
wherein at least two of the second driving signals have inverted waveforms from each other.

20. The driving method of claim 19, wherein a sum of amplitudes of the first driving signals is 0, and
wherein a sum of amplitudes of the second driving signals is 0.

* * * * *